A. M. LAYCOCK.
BEARING AND PROCESS OF MAKING THE SAME.
APPLICATION FILED SEPT. 13, 1916. RENEWED AUG. 8, 1917.
1,262,681.  Patented Apr. 16, 1918.
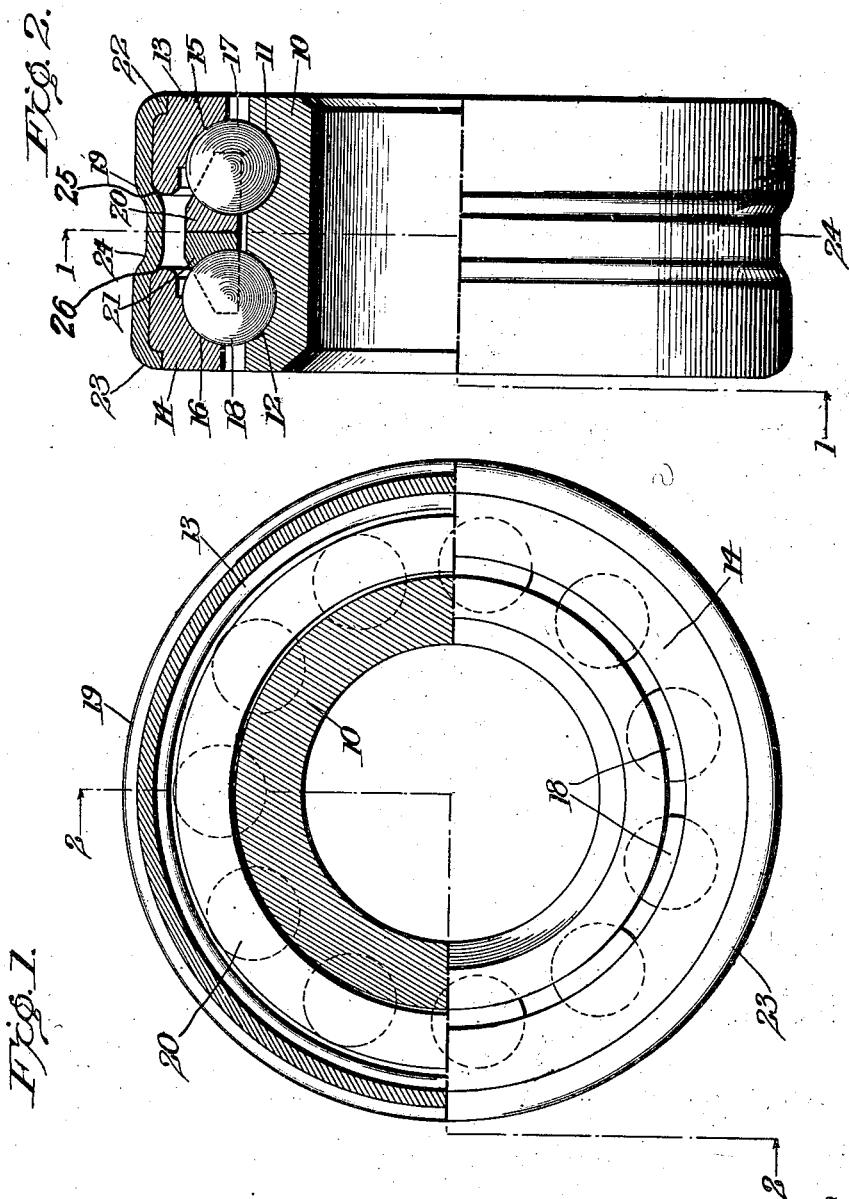

UNITED STATES PATENT OFFICE.

ARTHUR M. LAYCOCK, OF KINGSTON, PENNSYLVANIA, ASSIGNOR TO THE NEW DEPARTURE MANUFACTURING COMPANY, OF BRISTOL, CONNECTICUT, A CORPORATION OF CONNECTICUT.

BEARING AND PROCESS OF MAKING THE SAME.

1,262,681.  Specification of Letters Patent.  Patented Apr. 16, 1918.

Application filed September 13, 1916, Serial No. 119,899. Renewed August 8, 1917. Serial No. 185,185.

*To all whom it may concern:*

Be it known that I, ARTHUR M. LAYCOCK, residing at Kingston, county of Luzerne, State of Pennsylvania, and being a subject of the King of Great Britain who has taken out first papers for naturalization as a citizen of the United States, have invented a certain new and useful Bearing and Process of Making the Same, of which the following is a full, clear, and exact description, such as will enable others skilled in the art to which it appertains to make and use the same, reference being had to the accompanying drawings, forming part of this specification.

My invention relates to antifriction bearings, and more particularly to such bearings which embody a divided race-member.

In practice it sometimes happens that bearings having divided race-members are secured to their wheels or other seats by too great pressure against the sides of such race-members, and this results in pressing such race-member-parts too hard against their coöperating balls or other antifriction members; this, of course, interferes with proper rolling of the balls, and, indeed, sometimes the pressure is sufficient to so lock the balls and both race-members together that no movement occurs between the race-members and the bearing thus ceases to operate.

One object of my invention is to provide a structure in which the parts of the divided race-member can be accurately set with respect to their antifriction members and excessive pressure of these parts against the antifriction members is prevented; a further object is to provide a structure in which the race-parts and the antifriction members can be thus accurately set and are securely held in such relationship; and a still further object is to provide a convenient and efficient process by which my bearing can be made. To these ends, and also to improve generally upon devices and processes of the character indicated, my invention consists in the various matters hereinafter described and claimed.

In the accompanying drawings, Figure 1 is a side elevation of a bearing embodying my invention, this view being partly in section, on about the line 1—1 of Fig. 2; and Fig. 2 is an edge view thereof, also partly in section, on about the line 2—2 of Fig. 1.

In these drawings, in which the invention is shown embodied in a double-row ball bearing of a well known construction, 10 indicates the cylindrical sleeve or inner race-member, having the parallel ball races 11 and 12 in its periphery, 13 and 14 are the rings which have race portions 15 and 16, respectively, and constitute parts of the outer, divided race-member, 17 and 18 are the rows of antifriction members (here shown as balls) which coöperate, respectively, with the races 11 and 15 and the races 12 and 16, these ball rows being illustrated as provided with the usual separator parts 20 and 21, and 19 is the tubular, sheet-metal casing which fits about the rings 13 and 14 and has its edges 22 and 23 bent (usually by spinning) over outer portions of the rings to keep these race-rings from spreading apart.

According to my invention, when the parts are assembled, with the antifriction members, 17 and 18, in their races and the parts, 13 and 14, of the divided race-member in the casing, the casing is bent to produce stops, as indicated at 25 and 26, in the paths of said parts of the divided race-member in their direction of travel toward their coöperating antifriction members, so that these stops prevent said race-member parts, 13 and 14, from being too closely forced upon, and thus binding, the antifriction members, even when pressure is applied against the outer faces of those parts. And by thus bending the casing at the places determined by the positions which the divided race-member-parts themselves occupy when set in the proper relation to their coöperating antifriction members, I am able to have the stops 25 and 26, at just the proper distance apart for each particular bearing. In other words, in the here illustrated embodiment of my invention, the casing is bent (preferably by spinning) to produce the projection or bead 24 which extends in between the inner edges of the rings 13 and 14 and from one such edge to the other, so that the casing becomes a stop-member with firm and unyielding stops and the rings 13 and 14 cannot be further pushed toward each other and thus made to bind upon the balls; and by bending the casing of any particular bearing at those places which the inner edges of the rings of that bearing occupy when those rings are in just the proper engagement with their coöperating balls, 17 and 18, not only are the rings 13 and 14 prevented from binding upon the balls but also they are permitted to properly engage such balls. It is, of course, understood that in the commercial manufacture of bearings there is necessarily some variation in size of similar parts, and that a certain closeness of engagement is necessary between antifriction members and their coöperating race-parts to insure proper running conditions, so that to get nice results the race-members of each particular bearing must be properly adjusted to the balls of that bearing, the space between the parts of the divided race-member being provided so that that adjustment can be effected. By forming the stops as bends 25 and 26 in the sheet metal casing 19, whose stop-producing portions can be bent variously with respect to each other, I am enabled to have the stops at just those particular places necessary to conform to the proper relationship demanded by the divided race-member-parts of any particular bearing, and I am, therefore, enabled to simply and inexpensively produce a bearing which prevents the divided race-member-parts from binding the antifriction members and yet permits such elements of each particular bearing to bear accurately against each other. Furthermore, in this embodiment of my invention, each divided race-member-part 13 and 14, is confined between a set of oppositely-lying stops (as 22 and 25 for the ring 13) which engage oppositely-lying portions of such part, whereby both of the parts of the divided race-member are secured to the casing and securely held in their desired positions.

Of course, should the rings 13 and 14 be found too closely set against the balls in assembling, they can be forced away from the balls by spinning pressure exerted upon a stop portion 25 or 26.

In practice I prefer to assemble the rings 13 and 14 in the casing and into their proper relationship with the balls, and to then bend the several stops simultaneously over the edges of such rings. This serves to hold each ring in its proper position upon its balls while the casing is being bent about such ring and about the other ring, and the preservation of the previously determined relationship between the antifriction members and the race-members is thus assured.

What I claim as my invention is:

1. An antifriction bearing comprising a race-member, a divided coöperating race-member whose parts are provided with race portions, antifriction members coöperating with said race-members, and a stop-member having stops in the paths of movement of said race-member-parts toward said antifriction members, said stops, due to movability of the stop-affording parts with respect to each other, being adjusted to the particular relationship of the race-member-parts; substantially as described.

2. An antifriction bearing comprising a race-member, a divided coöperating race-member whose parts are provided with race portions, antifriction members coöperating with said race-members, and a stop-member having unyielding stops in the paths of movement of said race-member-parts toward said antifriction members, said stops, due to movability of the stop-affording parts, being adjusted to the particular relationship of the race-member-parts; substantially as described.

3. An antifriction bearing comprising a race-member, a divided coöperating race-member whose parts are provided with race portions, antifriction members coöperating with said race-members, and a stop-member bent to produce stops in the paths of movement of said race-member-parts toward said antifriction members; substantially as described.

4. An antifriction bearing comprising a race-member, a divided coöperating race-member whose parts are provided with race portions, antifriction members coöperating with said race-members, and a casing having stops in the paths of movement of said race-member-parts toward said antifriction members, said stops, due to movability of the stop-affording parts with respect to each other, being adjusted to the particular relationship of the race-member-parts; substantially as described.

5. An antifriction bearing comprising a race-member, a divided coöperating race-member whose parts are provided with race portions, antifriction members coöperating with said race-members, and a casing bent to produce stops in the paths of movement of said race-member-parts toward said antifriction members; substantially as described.

6. An antifriction bearing comprising a race-member, a divided coöperating race-member whose parts are spaced apart and provided with race portions, antifriction members between said race portions and coöperating with said race-members, and a casing having a portion thereof bent to extend in between said race-member-parts to space them apart; substantially as described.

7. An antifriction bearing comprising a race-member, a divided coöperating race-member whose parts are spaced apart and provided with race portions, antifriction members coöperating with said race-members, and a casing bent to form sets of oppositely-lying stops, each of said sets confining one of said race-member-parts against movement toward and away from said antifriction members; substantially as described.

8. An antifriction bearing comprising a race-member, a divided coöperating race-member whose parts are spaced apart and provided with race-portions, antifriction members between said race portions and coöperating with said race-members, and a casing having its intermediate portion bent to extend in between said race-member-parts and having other portions bent over shoulders of said parts, whereby said parts are confined; substantially as described.

9. An antifriction bearing comprising a race-member, a divided coöperating race-member whose parts are spaced apart and provided with race-portions, antifriction members between said race portions and coöperating with said race-members, and a casing having its edges bent over the outer faces of said race-member-parts and its intermediate portion bent to extend in between said parts, whereby said parts are confined; substantially as described.

10. An antifriction bearing comprising a race-member, a divided coöperating race-member whose parts are provided with race portions, antifriction members coöperating with said race-members, and a casing secured to one of said race-member-parts and bent to produce a stop in the path of movement of the other said race-member-part toward its coöperating antifriction members; substantially as described.

11. An antifriction bearing comprising a race-member, a divided coöperating race-member whose parts are provided with race portions, antifriction members coöperating with said race-members, and a casing secured to one of said race-member-parts and bent over oppositely facing portions of the other thereof; substantially as described.

12. The process of making antifriction bearings having a divided race-member and a casing, which consists in assembling the race members, antifriction members and casing, and bending said casing simultaneously over oppositely-lying faces of one of the parts of the divided race-member while the other thereof is held with respect to said first mentioned part; substantially as described.

13. The process of making antifriction bearings having a divided race-member and a casing, which consists in assembling the race members, antifriction members and casing, and bending said casing simultaneously over oppositely-lying faces of both parts of said divided race-member; substantially as described.

In testimony whereof I affix my signature.

ARTHUR M. LAYCOCK.